(12) United States Patent
Watson et al.

(10) Patent No.: US 10,432,612 B2
(45) Date of Patent: Oct. 1, 2019

(54) METHODS AND SYSTEMS FOR REMOTE ACCESS TO A TRANSPORATION VEHICLE SYSTEM

(71) Applicant: Panasonic Avionics Corporation, Lake Forest, CA (US)

(72) Inventors: Philip Watson, Lake Forest, CA (US); Michael Luke Dierickx, Temecula, CA (US); Sanjiv Sitaram Pimple, Irvine, CA (US); Sheng Tong, Ladera Ranch, CA (US); Jason Kong, Irvine, CA (US); Kwok Liang Poo, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 225 days.

(21) Appl. No.: 15/680,132

(22) Filed: Aug. 17, 2017

(65) Prior Publication Data

US 2018/0124040 A1    May 3, 2018

Related U.S. Application Data

(60) Provisional application No. 62/413,880, filed on Oct. 27, 2016.

(51) Int. Cl.
| | |
|---|---|
| *H04L 29/06* | (2006.01) |
| *B60R 25/24* | (2013.01) |
| *H04W 12/06* | (2009.01) |
| *H04W 12/08* | (2009.01) |
| *G06F 21/33* | (2013.01) |
| *G06F 21/44* | (2013.01) |

(52) U.S. Cl.
CPC ........ *H04L 63/0823* (2013.01); *B60R 25/241* (2013.01); *G06F 21/33* (2013.01); *G06F 21/44* (2013.01); *H04L 63/0272* (2013.01); *H04L 63/18* (2013.01); *H04W 12/06* (2013.01); *H04W 12/08* (2013.01); *B60R 2325/10* (2013.01)

(58) Field of Classification Search
CPC . H04L 63/0823; H04L 63/18; H04L 63/0272; G06F 21/44; G06F 21/33; H04W 12/06; H04W 12/08; B60R 25/241; B60R 2325/10
See application file for complete search history.

(56) References Cited

U.S. PATENT DOCUMENTS

| | | |
|---|---|---|
| 7,269,761 B2 | 9/2007 | Yi |
| 10,298,692 B2 | 5/2019 | Lauer |

OTHER PUBLICATIONS

CDW, "Digi TransPort WR21—router—WWAN—desktop," Mfg. Part: WR21-L52A-GE1-TA|CDW, Online Catalog Entry, Downloaded Oct. 11, 2016.

*Primary Examiner* — Ayoub Alata
(74) *Attorney, Agent, or Firm* — Brian Furrer (57) ABSTRACT

Methods and systems for a transportation vehicle are provided. For example, one method includes storing or installing a security certificate in a portable device associated with an aircraft, the security certificate defining a duration for using the portable device for remotely accessing an aircraft computing system; obtaining the security certificate from the portable device, after validating a request from a user console; and providing the security certificate to the user console to access the aircraft computing system via the portable device for no longer than the duration defined by the security certificate.

20 Claims, 7 Drawing Sheets

METHODS AND SYSTEMS FOR REMOTE ACCESS TO A TRANSPORATION VEHICLE SYSTEM

CROSS-REFERENCE TO RELATED APPLICATIONS

This application claims priority to U.S. provisional patent application Ser. No. 62/413,880 filed on Oct. 27, 2016. Priority to the provisional patent application is expressly claimed, and the disclosure of the provisional application is hereby incorporated herein by reference in its entirety and for all purposes.

TECHNICAL FIELD

The present disclosure relates to transportation vehicles in general, and more particularly, to remotely and securely accessing a computing system of a transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

Often maintenance of IFE systems or other aircraft systems require technical experts to gain access to log data/computing systems. Conventional solutions for such access are expensive and inefficient because in conventional systems, often experts are typically sent to an appropriate location (for example, an airport) with test equipment to diagnose IFE or other aircraft system problems. Therefore, it is desirable to have an efficient mechanism for remote access to aircraft systems (or any other transportation vehicle system), without compromising the security of the aircraft systems and associated data.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems for a transportation vehicle are provided. For example, one method includes storing a security certificate in a portable device associated with an aircraft, the security certificate defining a duration that the portable device may be used for remotely accessing an aircraft computing system; obtaining the security certificate from the portable device, after validating a request from a user console; and providing the security certificate to the user console to access the aircraft computing system via the portable device for no longer than the duration defined by the security certificate.

In another aspect, a method includes associating a portable device with a transportation vehicle for remotely accessing a computing system of the transportation vehicle; establishing a first secured connection between a user console and a network computer; establishing a second secured connection between the network computer and the portable device; obtaining by the network computer a security certificate from the portable device using the second secured connection; providing the security certificate to the user console by the network computer; and using the security certificate and the second secured connection by the user console to access the computing system for no longer than the duration defined by the security certificate.

Figure 1A:
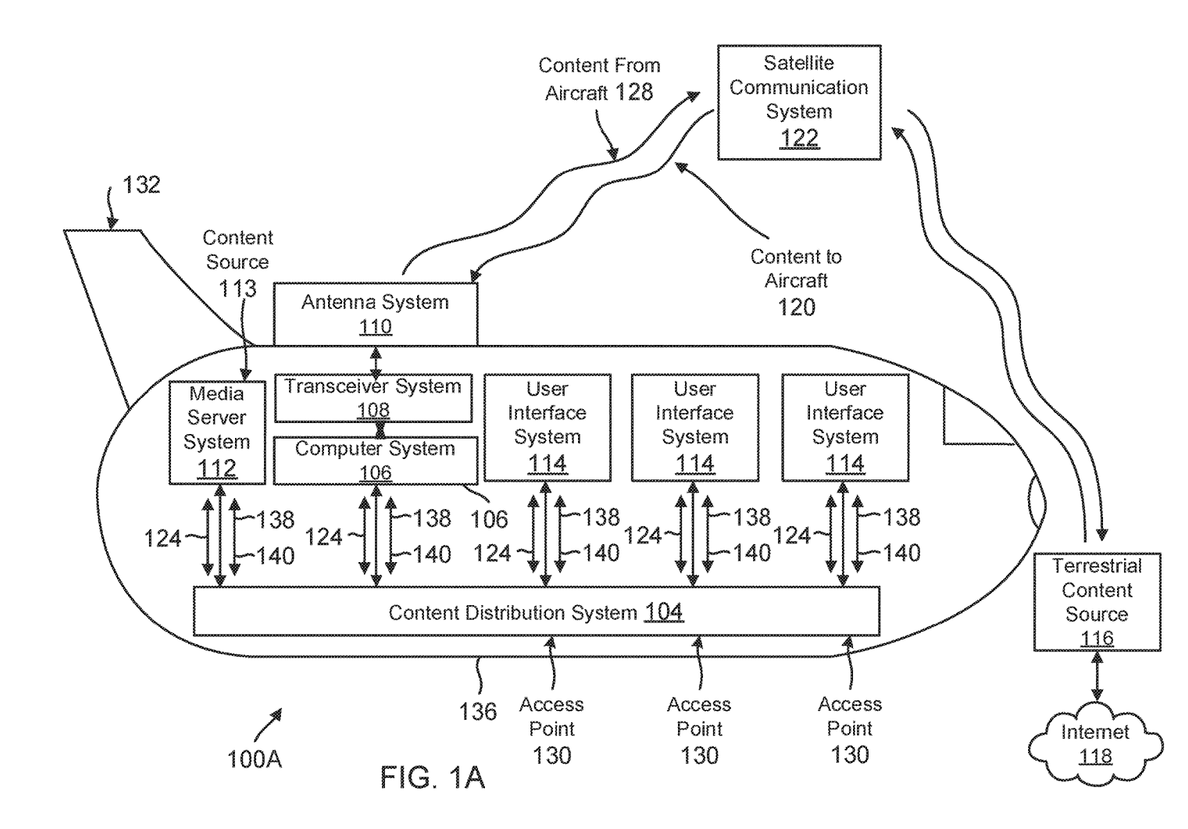
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audio-book content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a personal electronic device (PED) to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
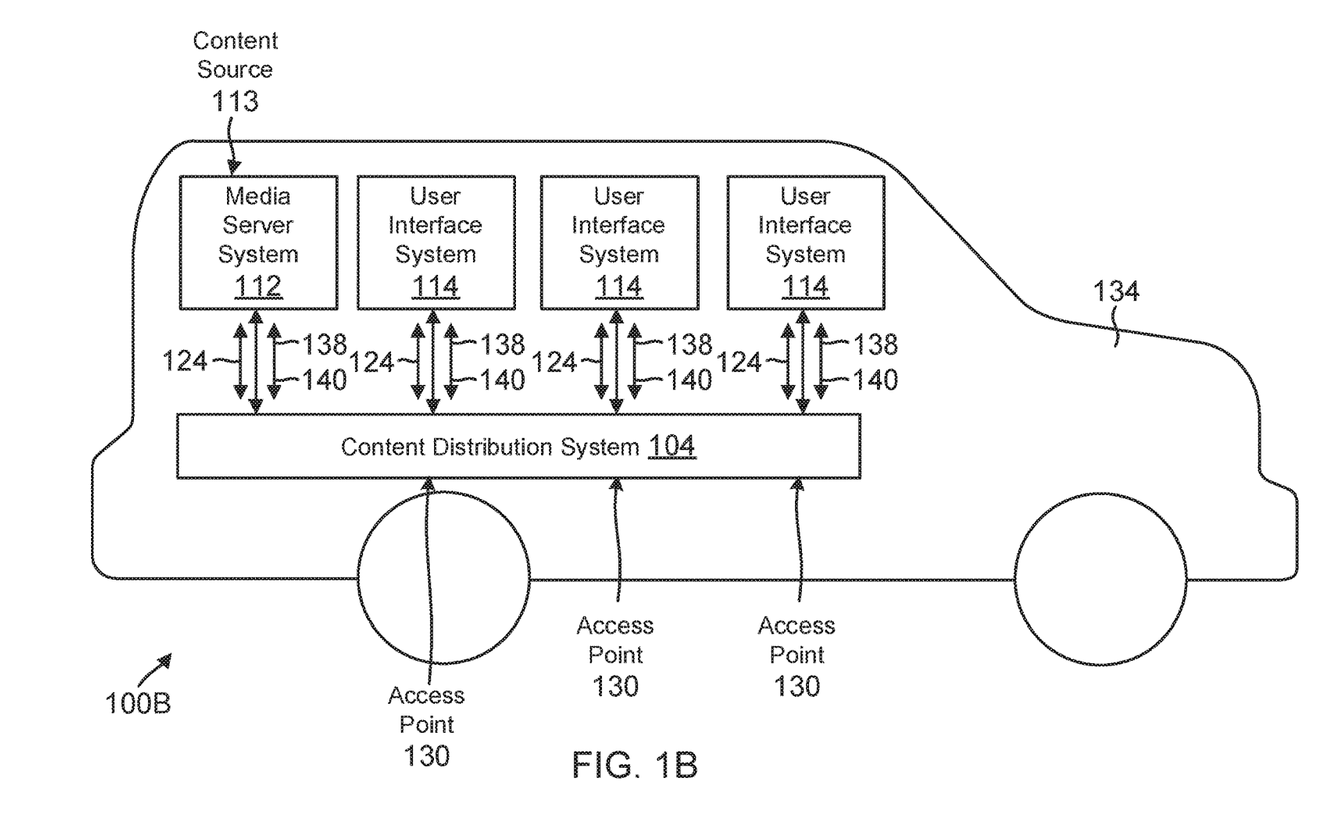
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
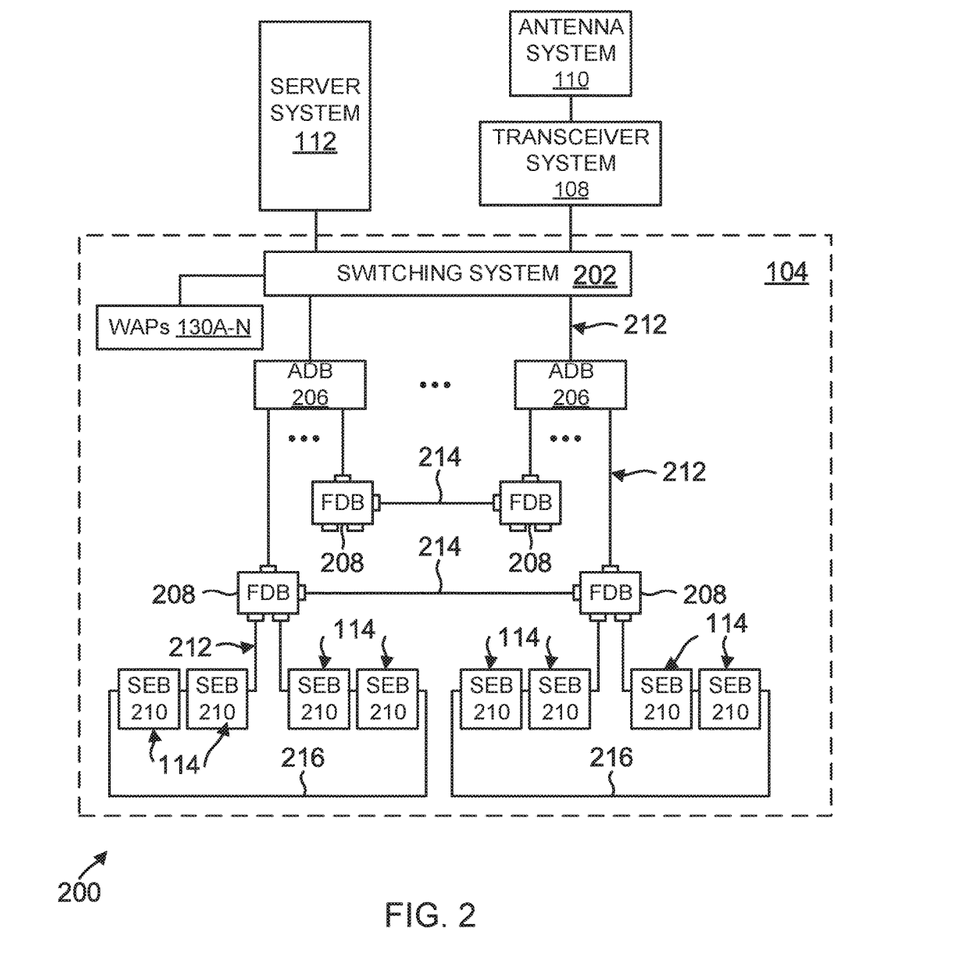
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
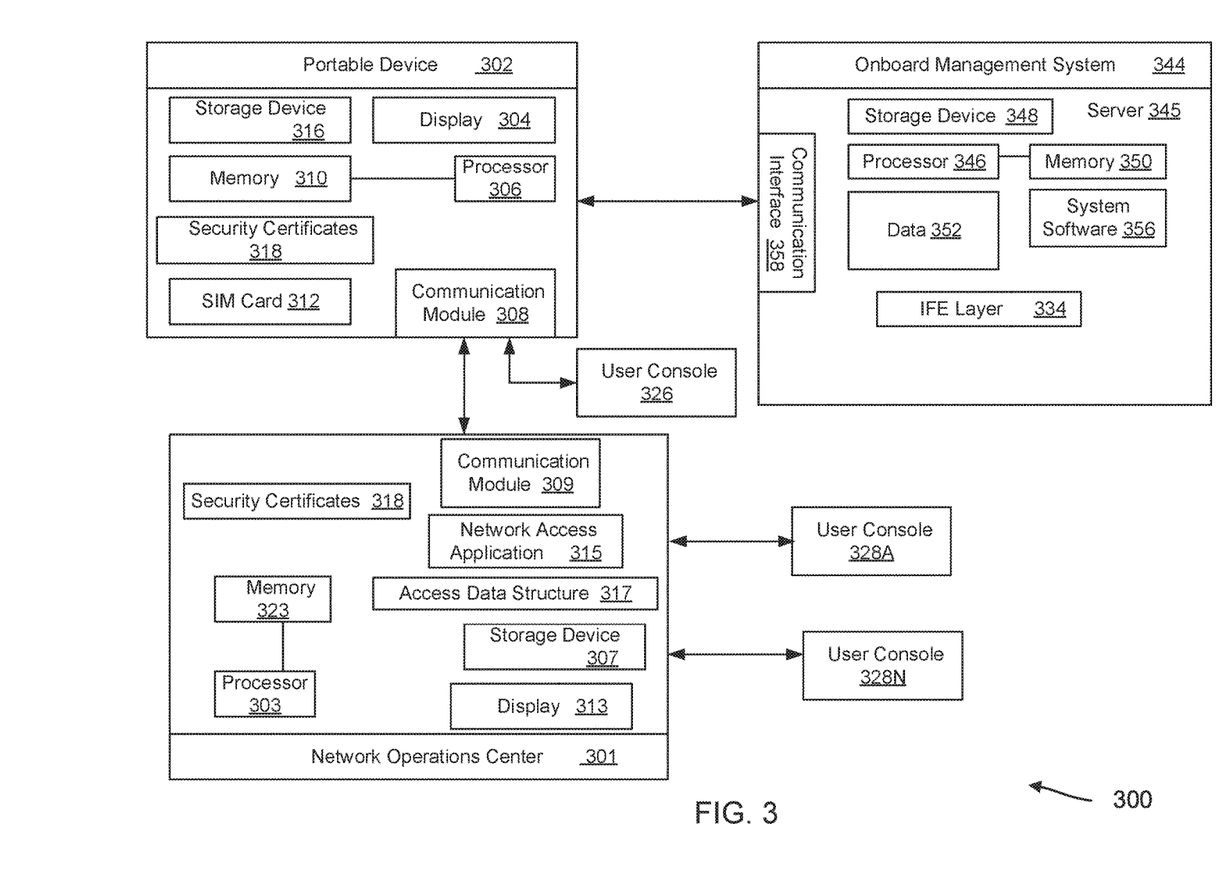
FIG. 3 shows an example of an overall system for remote access to an aircraft computing system, according to one aspect of the present disclosure.

System 300: FIG. 3 shows an example of a system 300 using a portable device 302 (may simply be referred to as device 302) configured to securely and remotely access a transportation vehicle's computing system (such as an aircraft computing system), according to one aspect of the present disclosure. In one aspect, device 302 may be a modem that supports Cellular, Wired LAN and Wireless LAN (commonly known as Wi-Fi, a type of wireless LAN) connections, for example, the Digi Transport® WR44 (without derogation of any trademark rights), a Wi-Fi to cellular router that is available from Digi International, Minnesota. It is noteworthy that other similar cellular modems/devices may be used to implement the adaptive aspects described herein. When available, the Wired LAN and Wireless LAN connections may be used as an alternative to the cellular connection, for example, when a cellular signal is weak, inaccessible, or expensive. Wireless LAN (Wi-Fi) may be use if it is available, however Wi-Fi is not generally as ubiquitous as cellular signals in aircraft maintenance areas.

In one aspect, device 302 may include a processor 306 that has access to a memory 310 via a bus system/interconnect (not shown) for executing stored firmware instructions out of a memory 310. Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

Device 316 may also include a storage device 316 that may be, or may include any storage medium for storing data in a non-volatile manner, such as a flash device or other storage device types.

In one aspect, device 302 includes or has access to one or more security certificates 318 that may be stored in storage device 316. The security certificates 318 may include unique VPN (virtual private network) credentials. The security certificates 318 may be assigned to specific aircraft by a network operations center (may be referred to as "NOC" or network computer) 301. The security certificates 318 are used to access an aircraft system for no longer than the duration than as defined in the certificates, as described below in more detail.

In another aspect, device 302 also includes at least one SIM (subscriber identity module) card 312 with a private access point name (APN). In one aspect, the APN is provided by NOC 301. In one aspect, the SIM card 312 is also configured to store a static Internet Protocol (IP) address.

In one aspect, the VPN credentials and the static address are provided to an authorized user for accessing an aircraft system via device 302 and user console 326, as described below in more detail. In another aspect, the security certificates are used to create multiple VPN connections to access an aircraft system, as described below in more detail.

In one aspect, device 302 uses a communication module 308 to communicate directly with a user console 326, an onboard management system 344 or with a NOC 301, according to one aspect of the present disclosure. In one aspect, the communication module 308 may include one or more interfaces to communicate with different devices/systems. It is noteworthy that although a single block is shown for the communication module 308 for convenience, the communication module 308 may have different interface logic and circuitry to comply with different communication protocols/standards.

In one aspect, the onboard management system 344 includes a server 345 (similar to the media server 112 and/or computer system 106). The server 345 includes a processor 346 that has access to a memory 350 via a bus system/interconnect (not shown). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, entertainment content and other information). System software 356 of the onboard management system 344 is executed by the processor 346 to control the overall operation of the server 345 including monitoring the status of network connections to ground systems.

In one aspect, the onboard management system 344 maintains data 352. Data 352 may include system logs generated by system software 356 or other modules, maintenance logs, error logs and other information. This information may be accessed remotely using device 302, as described below in detail.

Data 352 may also include flight data, for example flight itinerary including origin location, layover locations, destination location, language preference, arrival time and other information. Data 352 may also include passenger data that identifies each passenger for a flight, a seat assigned to a passenger, and any other information that can uniquely identify the passengers. Data 352 may be retrieved from an airline ground system (not shown) before flight departure and may be updated during flight. Although data 352 is shown as a single block, the stored data may be part of one or more data structures.

In one aspect, processor 346 executes an IFE layer 334 that provides in-flight entertainment and other options to users. The IFE layer 334 provides audio/video content as well as controls for accessing the content. The IFE layer 334 uses a communication interface 358 to interface with seat devices and passenger devices. In one aspect, the IFE layer 334 or a portion thereof is executed at seat devices (not shown).

In one aspect, server 345 communicates with device 302 via the communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, NOC 301 may include one or more computing systems that may include one or more processors 303 that each have access to a memory 323 via a bus system/interconnect (not shown) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 303 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, NOC 301 includes a display 313 to display information. Display 313 may also include a touch screen for receiving input commands.

NOC 301 includes a storage device 307 that may be, or may include any storage medium for storing data in a non-volatile manner, such as one or more magnetic or optical based disks, flash memory, or solid-state drive. The storage device 316 may be used to store a network access application 315, an access data structure 317 and security certificates 318.

In one aspect, application 315 manages access to portable device 302 using the access data structure 317 and certificates 318. The access data structure 317 stores an identifier to identify device 302, user credentials that are used to request access to the device 302, and aircraft information for example, aircraft identifiers that are associated with the portable device, expiration until a certificate expires and is no longer valid, (thereby defining the duration that the aircraft may be remotely accessed), and other information. In one aspect, security certificates 318 are valid for a limited duration so that aircraft system 344 can only be accessed for the limited duration. This ensures overall security of the aircraft system.

In one aspect, a communication module 309 is used to communicate with device 302 as well as authorized user consoles 328A-328N (may be referred to as user console or user consoles 328). In one aspect, the communication module 309 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the communication module 309 for convenience, the communication module may have different interface, cards, logic and circuitry to comply with the different communication protocols/standards.

In one aspect, user console 328 and 326 may be a mobile phone, a notebook, a tablet, a laptop or any other similar device that requests remote access to device 302/management system 344. The processes for remote access are described below in detail.

Figure 4A:
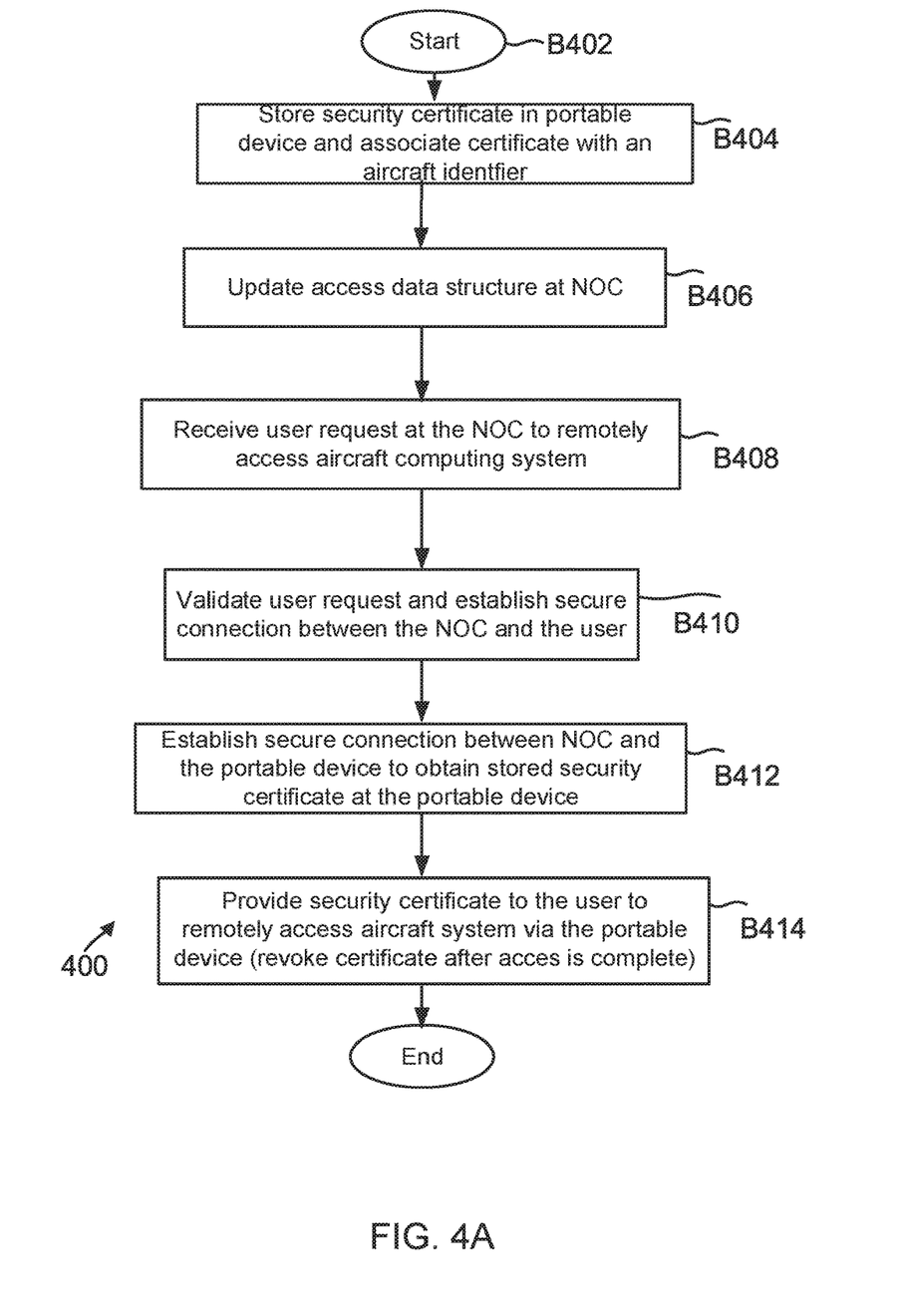
FIGS. 4A-4B show process flow diagrams for remotely accessing a computing system of a transportation vehicle system, according to one aspect of the present disclosure.

Process Flow: FIG. 4A shows a process 400 for remotely and securely accessing an aircraft computing system (for example, management system 344) via device 302, according to one aspect of this disclosure. The process starts in block B402, when device 302 is initialized for configuration. In block B404, one or more security certificates 318 are installed and stored in device 302. The security certificates 318 may be in in accordance with the X.509 standard or other standards, such as OpenPGP. For greater security however, the certificates are according to a unique standard established by the NOC 301 or security personnel, and specify a duration time, in addition to an expiration date. The SIM card 312 is preferably installed with a private access point name (APN) issued by the NOC 301 or security personnel for further enhanced security. In one aspect, the APN is provided by NOC 301. The security certificates 318 are valid for a limited duration and associated with an aircraft identifier that identifies an aircraft (for example, aircraft tail number). This ensures that the device 302 can only be used with a specific aircraft by authorized users for a limited duration. In particular, each certificate has an expiration, after which the certificate is no longer valid. As described above, each certificate preferably includes a duration time, after which the certificate becomes invalid. For greater security, the certificate is invalid after its expiration or the duration time, which occurs first. In one aspect, all default accounts from the manufacturer of device 302 are disabled for security reasons.

After the certificates 318 are installed, in block B406, the NOC 301 updates access data structure 317 to track and control access to the portable device 302 associated with a specific aircraft.

In block B408, the NOC 301 receives a user request to remotely access an aircraft system via the portable device 302. The user request is accompanied by proper user credentials, for example, user identifier, password, biometric information or any other credentials that are used by NOC 301 to authorize a user and grant access after verifying proper authorization.

In block B410, the user request is validated using access data structure 317. A virtual private network (VPN) connection is established between user console 328 and NOC 301. In one aspect, the VPN connection uses a secure tunnel for enabling secured access between computing devices/nodes. The VPN between user console 328 and NOC 301 enables the two computing devices to communicate securely to access device 302.

In block 412, NOC 301 establishes a secured connection with the portable device 302. This connection may be another VPN connection that is established between NOC 301 and device 302 to communicate securely. NOC 301 authenticates the stored security certificate 318 from device 302 to establish a VPN connection between NOC 301 and device 302. NOC provides device 302 remote access credentials to user 328. Remote access credentials are access validation types including, but not limited to, security certificate, username/password, challenge/response, multi-factor authentication (e.g., Two Factor Authentication). The user 328 can then use the device 302 remote access credentials to communicate with the device 302 using the second VPN connection. Once a connection between device 302 and user console 328 is established, in block B414, the user can access management system 344 (for example, data 352) to remotely perform diagnostics/corrective action. After the remote access is terminated, the device 302 may be unplugged so that the device is no longer connected to the aircraft system. For additional security, the certificate may be revoked by the NOC 301 or security personnel after access is complete as parenthetically indicated in block B414.

Figure 4B:
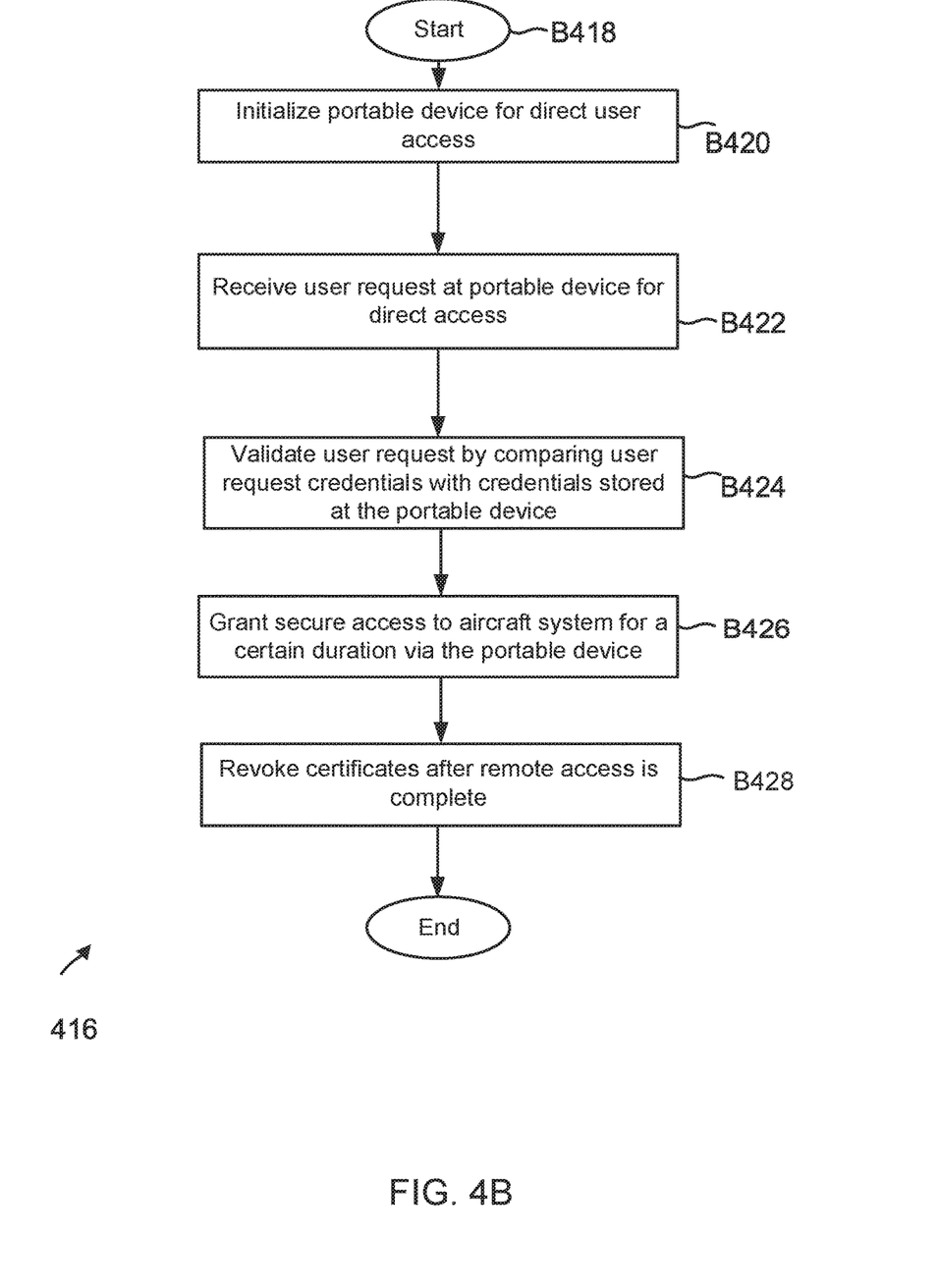

FIG. 4B shows another process 416 that enables a user console 326 to directly communicate with device 302, according to one aspect of the present disclosure. The process begins in block B418.

In block B420, device 302 is initialized and connected to the aircraft. All default accounts that are configured by the device manufacturer are disabled. It is noteworthy that the device 302 is only connected when remote access is desired, otherwise, the device 302 is not connected to the aircraft system. As described above, device 302 includes at least one SIM card 312 with static IP address and also stores security certificates 318 with VPN credentials. The device may include an additional SIM slot for installing a second SIM card 312 for using a local carrier's network to minimize roaming charges. In another aspect, device 302 may also store a PKI (public key infrastructure) certificate with a public and private key. The PKI certificate may be part of the security certificates 318. The user console 326 stores the corresponding key to communicate with the device 302.

In block B422, a user request is received by device 302. In one aspect, the user request includes the VPN credentials and the static IP address that are provided to the user and also stored in the portable device 302. In another aspect, the user portion of the PKI certificate may be used to initiate a connection.

In block B424, the user request is validated by comparing the stored VPN credentials and the static IP address with the VPN credentials and the static IP address in the user request. In another aspect, when the PKI certificate is used, the PKI certificate is validated. If authorized, the user is granted access in block B426 for a certain duration, until the certificate expires. This enables user console 326 to remotely access an aircraft computing system for a limited duration using a VPN. After the remote access is completed, the device 302 may be disconnected for security reasons. For additional security, the certificates are thereafter revoked as indicated in block B428.

Other security access credentials could be used instead of certificates. For example, security passwords of limited duration could be employed, with secondary authentication for enhanced security, e.g., the user requesting secure access must correctly return a code communicated to a mobile phone and telephone number previously assigned to the user by the NOC 301. Alternatively, security access credentials could be employed based on challenge-response authentication. After entry of a password for a request for secure access, the access is not provided until the requester responds correctly to a challenge code in which the response is a predetermined function of the challenge. Other types of security access credentials could be used as well, or combinations of the foregoing as described above.

The methods and systems disclosed herein provide innovative technology to remotely access aircraft systems, without having to physically send personnel to aircraft locations and yet maintain high security to prevent unauthorized remote access to aircraft systems and potential hacking. This is efficient and cost-effective especially since aircraft move from one location to another and sending aircraft personnel to various locations is expensive and inefficient.

Figure 5:
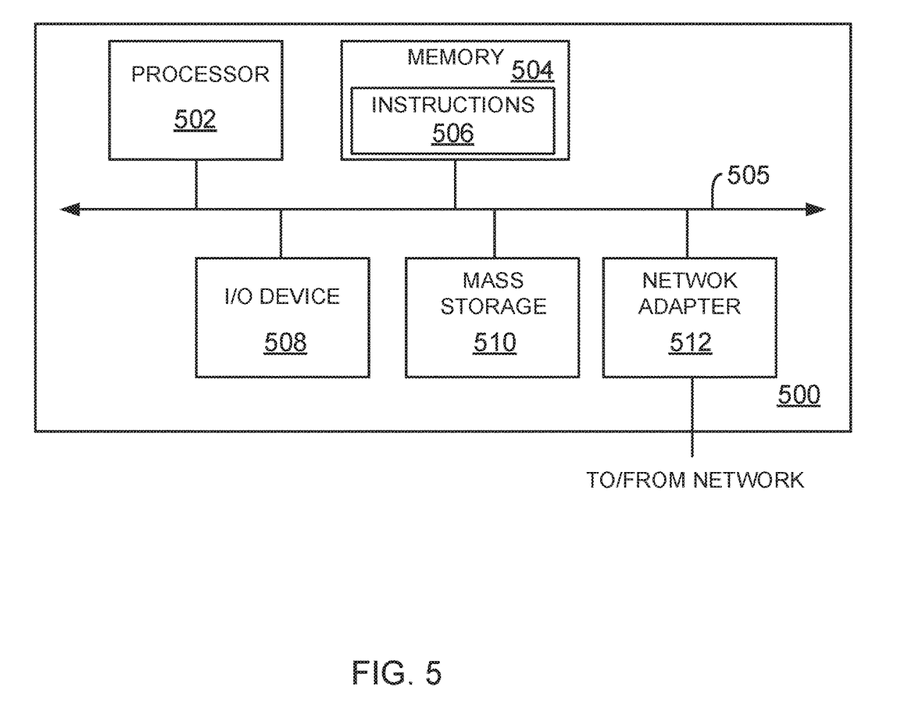
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent NOC 301, user consoles 326/328, media server 112, computing system 106, WAP 130, onboard management system 344, or any other device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A-4B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for accessing transportation vehicle systems are provided. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for vehicle remote access, the method comprising:
    associating a portable device with a transportation vehicle for remotely accessing a computing system of the transportation vehicle;
    establishing a first secured connection between a user computing device and a network computer, after validating credentials associated with a request by the network computer received from the user computing device to remotely access the computing system of the transportation vehicle via the portable device;
    obtaining by the network computer a security certificate and access credentials from the portable device;
    authenticating the security certificate by the network computer;
    in response to the authentication of the security certificate, establishing a second secured connection between the network computer and the portable device;
    in response to establishing the second secured connection, providing by the network computer the access credentials to the user computing device, via the first secured connection; and
    using the access credentials and the second secured connection by the user computing device to remotely access the computing system via the portable device for a duration defined by the security certificate.

2. The method of claim 1, wherein the portable device is a modem that supports at least one of Cellular, Wired LAN and Wireless LAN (Wi-Fi) connectivity.

3. The method of claim 1, wherein the first secured connection is based on a first virtual private network connection.

4. The method of claim 1, wherein the second secured connection is based on a second virtual private network connection.

5. The method of claim 1, wherein the transportation vehicle is an aircraft and the portable device is associated with an aircraft identifier.

6. The method of claim 5, wherein the computing system executes a portion of an in-flight entertainment system.

7. The method of claim 1, further comprising revoking the security certificate after remote access is completed.

8. A system for remote access of a transportation vehicle, the system comprising:
a memory including a machine readable medium comprising machine executable code; and a processor module coupled to the memory, the processor module executing the machine executable code to:
associate a portable device with the transportation vehicle for remotely accessing a computing system of the transportation vehicle;
establish a first secured connection between a user computing device and a network computer, after validating credentials associated with a request by the network computer received from the user computing device to remotely access the computing system of the transportation vehicle via the portable device;
obtain by the network computer a security certificate and access credentials from the portable device;
authenticate the security certificate by the network computer;
in response to the authentication of the security certificate, establish a second secured connection between the network computer and the portable device;
in response to establishing the second secured connection, provide by the network computer the access credentials to the user computing device, via the first secured connection; and
use the access credentials and the second secured connection by the user computing device to remotely access the computing system via the portable device for a duration defined by the security certificate.

9. The system of claim 8, wherein the portable device is a modem that supports at least one of Cellular, Wired LAN and/or Wireless LAN (Wi-Fi) connectivity.

10. The system of claim 8, wherein the first secured connection is based on a first virtual private network connection.

11. The system of claim 8, wherein the second secured connection is based on a second virtual private network connection.

12. A non-transitory, machine readable storage medium having stored thereon instructions for performing a method for remote access of a transportation vehicle, comprising machine executable code which when executed by at least one machine, causes the machine to:
associate a portable device with the transportation vehicle for remotely accessing a computing system of the transportation vehicle;
establish a first secured connection between a user computing device and a network computer, after validating credentials associated with a request by the network computer received from the user computing device to remotely access the computing system of the transportation vehicle via the portable device;
obtain by the network computer a security certificate and access credentials from the portable device;
authenticate the security certificate by the network computer;
in response to the authentication of the security certificate, establish a second secured connection between the network computer and the portable device;
in response to establishing the second secured connection, provide by the network computer the access credentials to the user computing device, via the first secured connection; and
using the access credentials and the second secured connection by the user computing device to remotely access the computing system via the portable device for a duration defined by the security certificate.

13. The non-transitory storage medium of claim 12, wherein the portable device is a modem that supports at least one of Cellular, Wired LAN and Wireless LAN (Wi-Fi) connectivity.

14. The non-transitory storage medium of claim 12, wherein the first secured connection is based on a first virtual private network connection.

15. The non-transitory storage medium of claim 12, wherein the second secured connection is based on a second virtual private network connection.

16. The non-transitory storage medium of claim 12, wherein the transportation vehicle is an aircraft and the portable device is associated with an aircraft identifier.

17. The non-transitory storage medium of claim 16, wherein the computing system executes a portion of an in-flight entertainment system.

18. The non-transitory storage medium of claim 12, wherein the machine executable code further causes the machine to revoke the security certificate after remote access is completed.

19. The system of claim 8, wherein the transportation vehicle is an aircraft and the portable device is associated with an aircraft identifier.

20. The system of claim 19, wherein the computing system executes a portion of an in-flight entertainment system.

* * * * *